United States Patent
Megan et al.

(10) Patent No.: US 6,697,713 B2
(45) Date of Patent: Feb. 24, 2004

(54) CONTROL FOR PIPELINE GAS DISTRIBUTION SYSTEM

(75) Inventors: Lawrence Megan, East Amherst, NY (US); David F. Lennox, North Tonawanda, NY (US); Paul F. Scharf, North Tonawanda, NY (US); Derin Adebekun, Pittsford, NY (US); Mark Zhu, Windsor, CT (US)

(73) Assignee: Praxair Technology, Inc., Danbury, CT (US)

( * ) Notice: Subject to any disclaimer, the term of this patent is extended or adjusted under 35 U.S.C. 154(b) by 99 days.

(21) Appl. No.: 10/058,390

(22) Filed: Jan. 30, 2002

(65) Prior Publication Data

US 2003/0144766 A1 Jul. 31, 2003

(51) Int. Cl.$^7$ ............................................... G05D 16/00
(52) U.S. Cl. ..................... 700/301; 700/90; 700/266; 137/119.03
(58) Field of Search ..................... 700/301, 90, 28, 700/266; 137/1, 14, 119.03

(56) References Cited

U.S. PATENT DOCUMENTS

| | | | |
|---|---|---|---|
| 4,200,911 A | | 4/1980 | Matsumoto .................. 364/105 |
| 4,349,869 A | | 9/1982 | Prett et al. .................... 364/159 |
| 4,616,308 A | | 10/1986 | Morshedi et al. ............ 364/159 |
| 5,047,125 A | * | 9/1991 | Meier et al. .................... 203/2 |
| 5,257,640 A | * | 11/1993 | Delajoud ..................... 137/14 |
| 6,253,783 B1 | * | 7/2001 | Carlsen et al. ................ 137/14 |

OTHER PUBLICATIONS

Gelormino et al., "Model–predictive Control of a Combined Sewer System", Int. J. Control, vol. 59, No. 3 (1994) pp 793–816.

Megan et al., "Closed Loop Control Simulation of Pipeline Networks", Pipeline Simulation Interest Group Meeting (1999) pp 1–8.

Zhu et al., "Dynamic Modeling and Model Predictive Control of Gas Pipeline Networks", AIChE Annual Meeting (1999).

Zhu et al., "Dynamic Modeling and Linear Model Predictive Control of Gas Pipeline Networks", Journal of Process Control (2000) pp 1–38.

Seiver et al., "A Pyramid Approach to Advanced Control", Control Magazine (2000).

* cited by examiner

Primary Examiner—Jayprakash N. Gandhi
(74) Attorney, Agent, or Firm—David M. Rosenblum

(57) ABSTRACT

A method of controlling a gas distribution system in which one or more air separation plants supply gaseous oxygen and nitrogen products to pipeline sections. The air separation plants are controlled by supervisory control systems that direct production rates of the gaseous products to be consumed by customers connected to the pipeline sections. The gas distribution system is controlled by a model predictive control system in which empirically determined open loop response models are used to generate open loop responses of the pipeline sections due to changes in customer demands. Optimized closed loop responses in production rate requests to the supervisory control systems are generated by model predictive control techniques.

8 Claims, 3 Drawing Sheets

CONTROL FOR PIPELINE GAS DISTRIBUTION SYSTEM

FIELD OF THE INVENTION

The present invention relates to a method of controlling a gas distribution system having one or more pipeline sections that are supplied with gaseous oxygen and/or nitrogen by one or more air separation plants. More particularly, the present invention relates to such a method in which the air separation plants are controlled to supply the gaseous oxygen and/or nitrogen by a model predictive controller responsive to pipeline pressure and customer demand.

BACKGROUND OF THE INVENTION

Gaseous distribution systems include air separation plants that cryogenically rectify the air by well-known techniques to produce gaseous oxygen and gaseous nitrogen products. These products are supplied to customers through a pipeline that has one or more sections. Such gaseous distribution systems are controlled by the supplier manually to ensure that each section of a pipeline is above a certain minimum pressure set by customer contractual requirements. The pressure within a pipeline section relates to the flowrate of gaseous product within a pipeline section. Each customer that draws product from a pipeline section contracts with the supplier to draw a specific maximum flow rate of product from the pipeline. These contractual customer requirements are used to set the pipeline pressure.

The air separation plants may be located at a single geographical location or multiple locations. There can be multiple customers that draw product from each pipeline section. The individual plants are controlled by supervisory control systems in which production request changes are set to in turn control plant production. The pipeline is controlled by a pipeline operator, an individual who monitors a few strategic pipeline pressures and customer demands. If pressures begin to approach the high or low limits for a particular pipeline section, the operator calls the individual plants and verbally requests a change in production. The operator at the plant then enters the new production request level into the plant supervisory control system, at which point production is ramped to the requested level.

Where multiple air separation plants are to be controlled, it is difficult to make the best economic decision regarding which plant will supply the next increment of gas. Often, the decision is to exercise appropriate control over the plant closest to the point where the pressure change is needed. This problem is further complicated by the fact that air separation plants consume electricity and there exists electrical supply contracts that constrain the maximum electrical power a plant can draw and therefore, the amount of product a plant can produce. Moreover, plants are of varying sizes and therefore even without electrical supply contracts, they have various capabilities of supplying product.

Typically, the pipeline operator controls a pressure within a pipeline section to be substantially higher than the minimum pressure. This of course increases the overall expense in operating the pipeline system in that the air separation plants supplying the pipeline at a pressure that is higher than is necessary.

As a backup, if pipeline pressure falls below the minimum pressure, stored liquid oxygen is vaporized and then introduced into the pipeline. However, maintaining stored liquid oxygen reserves is an expensive proposition in that liquid oxygen is a more expensive product to produce than gaseous oxygen.

Simulation Studies have been conducted in which a single gas pipelines is controlled automatically, by model predictive control techniques. Examples of these studies are shown in Zhu et al., "Dynamic Modeling and Model Predictive Control of Gas Pipeline Networks" presented at the American Institute of Chemical Engineering Annual Meeting, Dallas, Texas, November 1999 by Zhu et al. and Zhu et al., and "Journal of Process Control", Zhu et al., "Dynamic Modeling and Linear Model Predictive Control of Gas Pipeline Networks", April, 2000. In both of these references, pre-stored models of the response of the pipeline and production of an air separation plant were used to compute an open loop response and a closed loop control action to maintain the pressure at a target value.

Automatic control has been applied to the control of multiple product compressor stations located within pipelines, such as appeared in Seiver et al., "A Pyramid Approach to Advanced Control", Control Magazine, July, 2000. Model predictive control has also been applied to prevent overflowing of sewer systems such as disclosed in Gelormino et al., "Model-predictive Control of a Combined Sewer System", International Journal of Control, vol. 59, 1994.

As will be discussed, the present invention applies model predictive control by way of a technique that allows gas distribution systems to be automatically controlled in an economically optimal fashion.

SUMMARY OF THE INVENTION

The present invention provides a method of controlling a gas distribution system having at least one pipeline section and at least one air separation plant. As used herein and in the claims, the term, "pipeline section" means a run of pipeline in which a pressure change along its length is solely due to frictional, fluidic losses. The at least one air separation plant is controlled by a supervisory control system responsive to production request changes to direct a production rate of at least one gaseous product to be consumed by at least one customer connected to the at least one pipeline section.

In accordance with the method, pressure is continually measured within the least one pipeline section. The pressure is dependent upon an actual flow rate of the at least one gaseous product within the at least one pipeline section. The pressure is controlled to be within a range that will ensure that the at least one customer will be able to obtain a required flow rate of the at least one gaseous product from the at least one pipeline section. The control involves measuring and storing pressure values of the pressure and production request values of production requests associated with each of the pressure values in a rolling history and inputting the pressure values as controlled variables and the production request values as manipulated variables into a model predictive controller. Within the model predictive controller, an open loop response of the pressure within the at least one pipeline section is calculated over a prediction horizon along with a set of production request changes of the at least one air separation plant, as a set of manipulated variables, required to at least in part restore the pressure to a target value within the pressure range from the open loop response.

The calculation of the target value, the open loop response, and the set of production request changes are based on at least one empirically determined step response model of pressure within the at least one pipeline section in response to a unit production change in the request value of the at least one air separation plant. The set of future production request changes are optimized to simultaneously minimize deviations of each of the production request changes and the pressure from the target value over the prediction horizon. The production request changes are inputted into the supervisory control system of the individual air separation plants to control the at least one air separation plant to produce the at least one product in accordance with the set of production request changes.

As can be seen from the above description of the present invention, unlike the prior art, model predictive control is more practically applied by the use of empirically based models. Moreover, there is no direct control of the air separation plants. Instead, control of the air separation plants remains in the supervisory control system. The model predictive control of the present invention generates production request changes based on the empirical model to in turn allow for the air separation plants to be integrated into the control scheme of the present invention with little modification if any.

Preferably, a further open loop response calculation is performed to determine a calculated pressure value at the commencement of the prediction horizon from a prior pressure value occurring just prior to the prediction horizon. The difference between an actual pressure valve measured at the commencement of the prediction horizon and the calculated pressure value is applied to the open loop response as a correction factor.

Calculation of the future changes to the production rate of the at least one air separation plant can be optimized on the basis of a least square calculation.

Customer flow rate values of the at least one gaseous product consumed by to the at least one customer can also measured and stored in the rolling history. The customer flow rate values are inputted into said model predictive controller as feed forward variables. The open loop response of the pressure within the at least one pipeline section can then be also based upon at least one empirically determined step response model of pressure within the at least one pipeline section in response to a unit change in customer flow rate of the at least one gaseous product to at least one customer.

It is to be noted that in case of instantaneous transients, if pressure falls below the range, the at least one (vaporized liquid) product is added to the at least one pipeline section. The at least one gaseous product can be vented from the at least one pipeline section if the pressure is greater than the range.

The at least one pipeline section can comprise at least first and second pipeline sections. There can be two of the gaseous products consisting of an oxygen gaseous product and a nitrogen gaseous product supplied to the first and second pipeline sections, respectively, where both oxygen and nitrogen are supplied from the same air separation plant. The model predictive controller is then responsive to the pressure in the at least the first pipeline section to determine the set of production request changes. The model predictive controller can also be responsive to pressure in each of the first and second pipeline sections. In such case it determines production request changes that are related to the first and second pipeline sections. The at least one air separation plant is controlled such that the production request changes related to the oxygen gaseous product supersedes those related to the nitrogen gaseous product to the extent required to maintain pressure within the range of the first pipeline section.

There can be a plurality of the air separation plants that are each capable of supplying the gaseous oxygen and gaseous nitrogen product in accordance with the constraint. The model predictive controller determines amounts of the gaseous oxygen.and the gaseous nitrogen products that each of the air separation plants are able to supply in accordance with the constraint. The model predictive controller determines sets of the production request changes for the air separation plants that are optimized by constrained linear optimization in accordance with the amount of the gaseous oxygen and nitrogen products. These constraints can comprise cost, contractual power limits, plant capacity, or combinations thereof.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
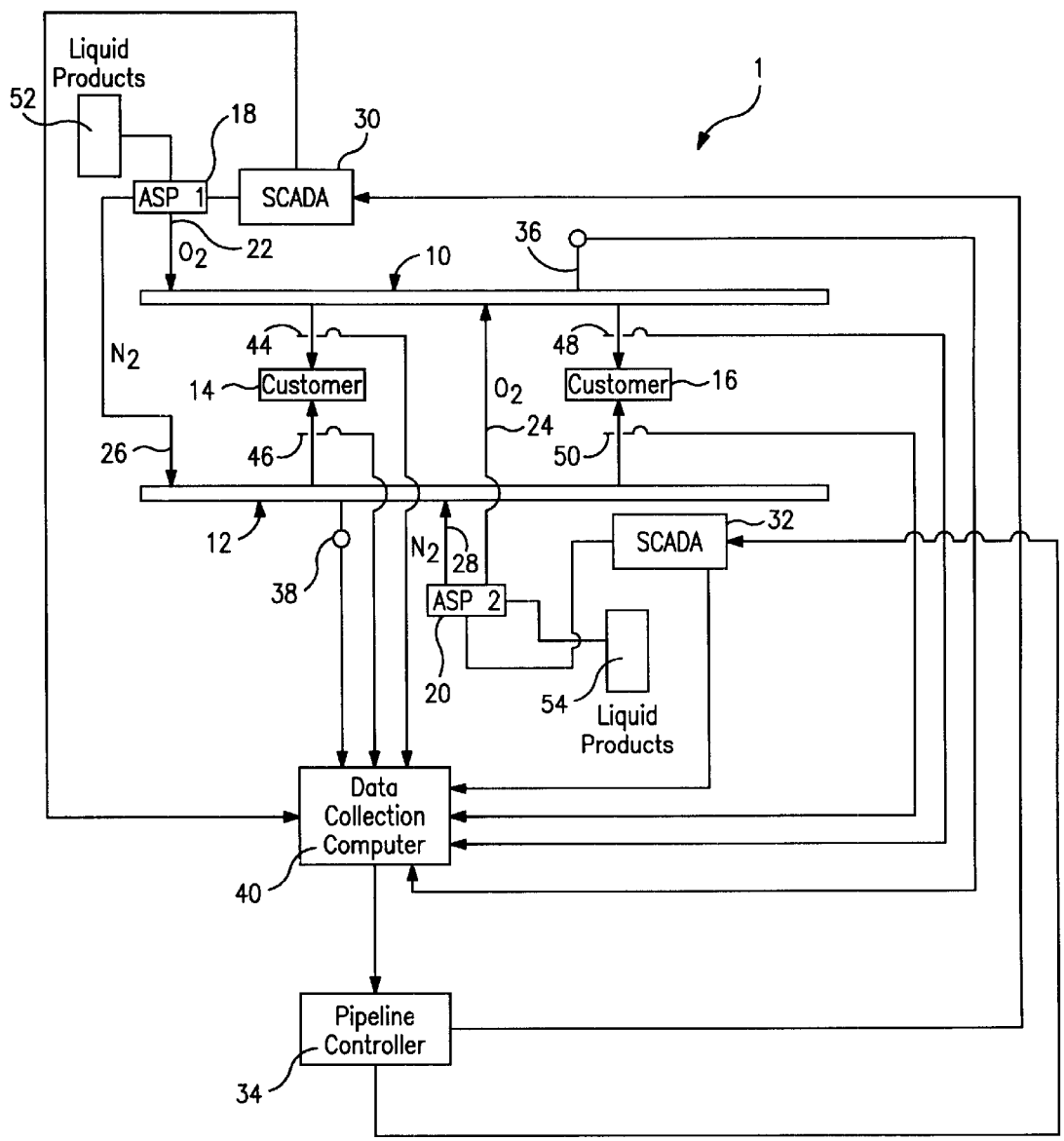
FIG. 1 is a typical gas distribution system to be controlled in accordance with the present invention.

With reference to FIG. 1 a gas distribution system 1 to be controlled in accordance with the present invention is illustrated. It is understood that gas distribution system 1 is illustrated for exemplary purposes and the systems to be controlled in accordance with the present invention may have a greater or lesser degree of complexity than that illustrated.

Gas distribution system 1 has pipeline sections 10 and 12 to supply gaseous oxygen and nitrogen, respectively, to customers 14 and 16. Pipeline sections 10 and 12 are supplied with gaseous oxygen and nitrogen products by air separation plants ("ASP1" and "ASP2") 18 and 20. Air separation plants 18 and 20 are connected to pipeline section 10 and 12 by oxygen conduits 22 and 24 and nitrogen conduits 26 and 28. In this regard, the purity of the oxygen and nitrogen that is supplied depends on the type of air separation plants employed to meet the requirements of customers 14 and 16.

Air separation plants 18 and 20 separate oxygen and nitrogen from the air by well known cryogenic distillation techniques. As known in the art, such techniques include compressing and cooling air to temperatures at or near the dew point of the compressed air and then distilling the air in one or more distillation columns to produce the oxygen and nitrogen products. Heat leakage into such plants and warm end heat exchange losses are controlled by the addition of refrigeration by such known means such as turboexpansion.

Air separation plants 18 and 20 are controlled by supervisory control systems programmed within supervisory control and data acquisition computers 30 and 32, respectively. Supervisory control systems act to automatically control the production of gaseous oxygen and nitrogen products by air separation plants 18 and 20 in response to production requests that serve as inputs thereto. There are a variety of control schemes that are employed in such control systems which function by electronic, digital control of such plant machinery as air compressors and the inlet vanes of turboexpanders. The particular control scheme is not part of the present invention and no particular control scheme is preferred. It should be pointed out, however, that the degree of complexity of control will depend on the type of air separation plant to be controlled. For instance, a single column nitrogen generator might have a simpler control system than a three column plant producing oxygen, nitrogen and argon products. In any event, both types of plants are applicable to the present invention in that the present invention contemplates a single pipeline section and a single plant producing a single gaseous product. Furthermore, it is important to note that in any supervisory control system a change in the production request will not change the production rate immediately in that it is impossible for the plant production to be immediately turned up or down. Rather plant production can only be adjusted over a period of time.

Production of the gaseous oxygen and nitrogen products is controlled by a pipeline controller 34, which can be a personal computer, that does not directly control air separation plants 18 and 20, but rather supplies production requests as an input to supervisory control systems programmed within supervisory control and data acquisition computers 30 and 32. In this regard, pipeline controller 34 is linked to the supervisory control systems by any of a variety of known analog or digital means to input the production requests.

As will be discussed in greater detail hereinafter, pipeline controller 34 functions on the basis of model predictive control of at least pipeline pressure as a controlled variable and production rate of the gaseous oxygen and/or nitrogen product(s) as a manipulated variable(s). Preferably, flow rate of the gaseous product being drawn by the customer is also used as a feed forward variable. A suitable control program is DMC+, that can be obtained from AspenTech of 10 Canal Park, Cambridge, Mass. 02141.

Pipeline pressures are measured by pressure sensors 36 and 38 and are introduced as an input to data collection computer 40. Additionally, the current production request of air separation plants 18 and 20 is collected by supervisory control and data acquisition computers 30 and 32 and is also introduced as inputs into data collection computer 40. Flows of gaseous oxygen and nitrogen to customer 14 are measured by flow meters 44 and 46 and feed into data collection computer 40. In this regard, each flow meter can be comprised of pressure sensors on opposite sides of an orifice plate with temperature sensors to correct for non-standard temperature. Similarly, flow meters 48 and 50 can be used to feed the flow of gaseous oxygen and nitrogen into data collection computer 40. All of these values are in turn fed as updates to a rolling history maintained within pipeline controller 34 on a periodic cycle time that can be for instance, 5 minutes. The foregoing values of pressure, flow and etc. serve as input to the model predictive control program within pipeline controller 34 to determine production requests to maintain pipeline pressures within pipeline sections 10 and 12 within allowable ranges. In this regard, pipeline controller 34 generates signals referable to the production requests and inputs such signals into supervisory control and data acquisition computers 30 and 32.

Figure 2:
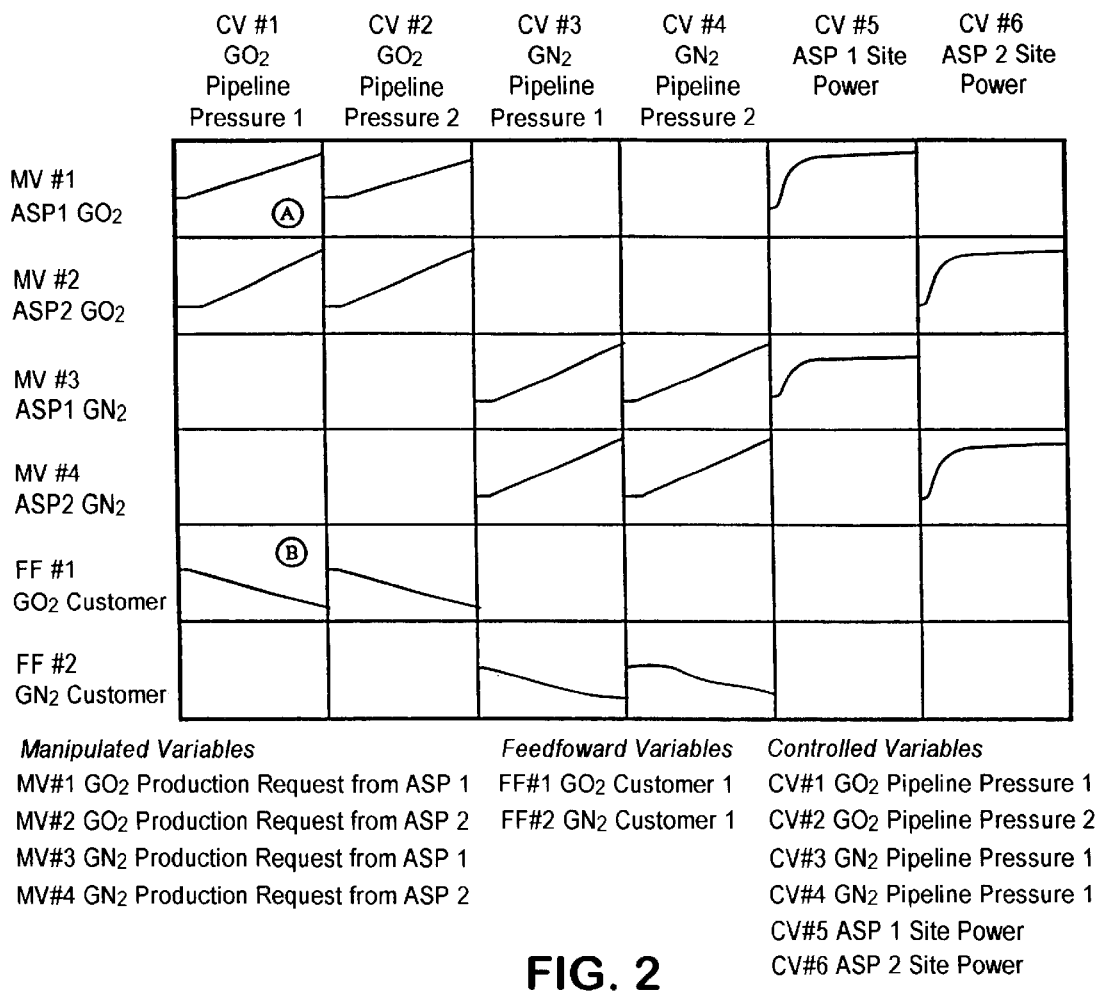
FIG. 2 is a pipeline controller matrix to be programmed into a pipeline controller in accordance with the present invention.

Stored within pipeline controller 34 are detailed empirically based step response models that are used in a known manner to find an open loop pressure response of pipeline sections 10 and 12. These models are inputted into model predictive control programs as data points. The open loop response is that response that would otherwise occur if no further control actions were taken. With reference to FIG. 2, a pipeline controller matrix is illustrated that contains models for use in the model predictive control program within the pipeline controller 34. Each individual element of the matrix represents the open loop response of a given controlled variable for a step change in corresponding manipulated variable over a fixed period of time. The time chosen for each model is selected by the user and relates to the dynamic response characteristics of the system. The selected time sets the length of the future prediction calculated by the model predictive controller. In gas distribution system 1, the time can be set at four hours. In other words when the model predictive control program calculates a prediction, it calculates the controlled variable responses 4 hours into the future. This time period is referred to as a prediction horizon.

In FIG. 2, controlled variables are shown along the top while manipulated variables are shown down the side. Empty boxes imply no significant relationship between a manipulated variable and a controlled variable. Utilizing the individual open loop models, the controller can predict the appropriate manipulated variable changes to keep the controlled variables within the desired operating limits.

The matrix element labeled "A" shows the response of controlled variable No. 1, the gaseous oxygen pressure within pipeline section 10, as a function of the manipulated variable, air separation plant 18 gaseous oxygen request registered within supervisory control and data acquisition computer 30. Matrix element "A" shows the response of the controlled variable, gaseous oxygen pressure within pipeline section 10, in open loop as a function of a unit step increase in manipulated variable, that is the air separation plant 18 gaseous oxygen production request over the time span of 4 hours. The particular response is an integrating or non-steady state relationship, which is common for inventory variables such as pipeline pressure. It is important to note that this curve is actually a summation of two phenomenon, namely, the response of the actual production flow of air separation plant 18 as a function in the change of request, and the response of pipeline pressure within pipeline section 18 from the change of pipeline flow.

Unlike the prior art, the specific models are determined through experimentation in the gas distribution system 1 itself by recording pressure in response to a change in production requests and then developing the models through data regression. For instance, models of unit increases in production of air separation plants 18 and 20 are produced by changing the production of each air separation plant 18 and 20 and noting the pipeline pressures as measured by pressure sensors 36 and 38.

The model predictive control program within controller 34 uses the cumulative effect of the individual models to predict the future change in a given controlled variable. For example, if both manipulated variables of the gaseous oxygen request for air separation plant 18 and air separation plant 20 are changing they will both have an additive effect on the controlled variable, namely the gaseous oxygen pressure in pipeline section 10. Here, the open loop response is based on the change in production requests, if any, to air separation plants 18 and 20 to produce a forecast of pressure over the prediction horizon from the pressure value recorded at the change of production requests. The matrix element "B" shows a relationship between the same controlled variable, namely gaseous oxygen pressure in pipeline 10 and to a feed forward variable of unit increase in flow rate of the gaseous oxygen to customer 14. This feed forward will be registered as a result of pressure measurement by flow meter 44. Feed forward variables are used to predict the controlled variable changes as a function of these variables which are measured, but which cannot be manipulated by the control system. There is no control over customer flow. However, it is known that they will effect pipeline pressure. For instance, as a valve at the customer site of customer 14 opens, pressure within the pipeline will decrease. Thus, matrix element "B" shows an increase flow from customer 14 will decrease the pressure if no further actions are taken. This also is additive along with the manipulated variables for other step changes such as for power as gaseous oxygen requests are increased to air separation plant 18 so will a controlled variable of power also increase. Obviously, the request for increased oxygen of air separation plant 18 will not have an effect on the site power for air separation plant 20.

Figure 3:
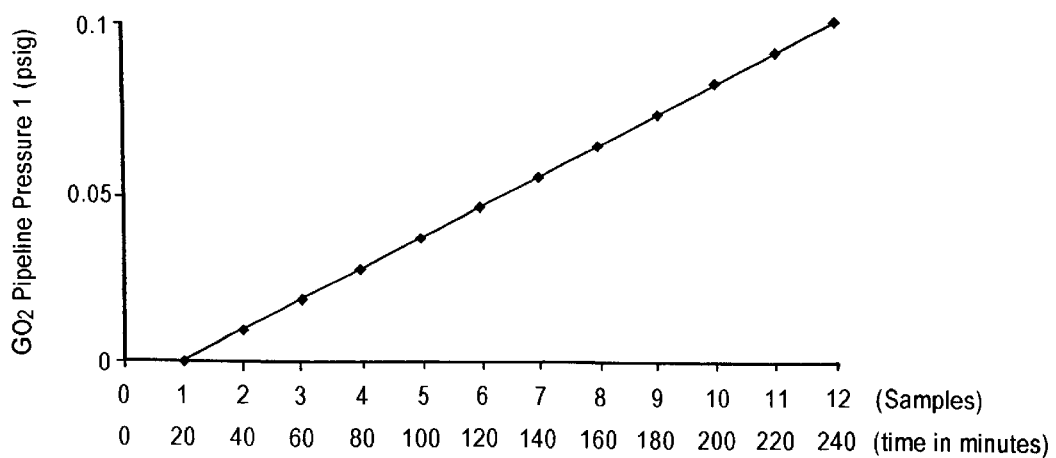
FIG. 3 is an enlarged view of a step response model labeled "A" in FIG. 2.

With reference to FIG. 3, the detail of matrix element "A" of FIG. 2 is illustrated. To simplify the graph each sample time is shown as 20 minutes rather than the five minute intervals of sample times discussed above. It shows the open loop response of gaseous oxygen pipeline pressure for a 1 lb mole per hour increase in air separation plant 18 for gaseous oxygen reduction request. The implicit assumption made by the controller is that the relationship shown in this graph holds regardless of the operating point. Furthermore, the magnitude of the pressure change for a change other than 1 lb mole per hour can be calculated by multiplying the model coefficients by the magnitude of the change. Thus, coefficient 12 would be calculated by the controller to be a 0.2 psig for a 2 lb per mole per hour increase in the manipulated variable and a −0.1 psig for a 1 lb per mole per hour decrease. In other words, the controller uses the models to calculate the controlled variable responses relevant to the current operating point rather than in absolute terms. The final coefficient 12 represents the value of the controlled variable at the end of the prediction horizon, which as stated previously is 4 hours.

An important feature of the pipeline controller is the ability to use only a subset of the matrix shown in FIG. 2. For example, if air separation plant 1 is out of service then all individual matrix models associated with it must be removed from the controller calculations. The remaining plants will then be used for control. While FIG. 2 only shows 2 plants in the matrix, the same idea can be extended to systems of up to 10 air separation plants. The manipulated variables can be added or removed from the controller calculation by manipulation of a simple on/off flag for each variable. In this regard, the present invention covers the situation in which only a single air separation plant is controlled to produce a single gaseous product within a single pipeline. The control of such situation can be basic, that is, solely based upon a model of the controlled variable of a unit increase in plant production or more advanced to take into account feed forward variables such as customer flow rate.

Figure 4:
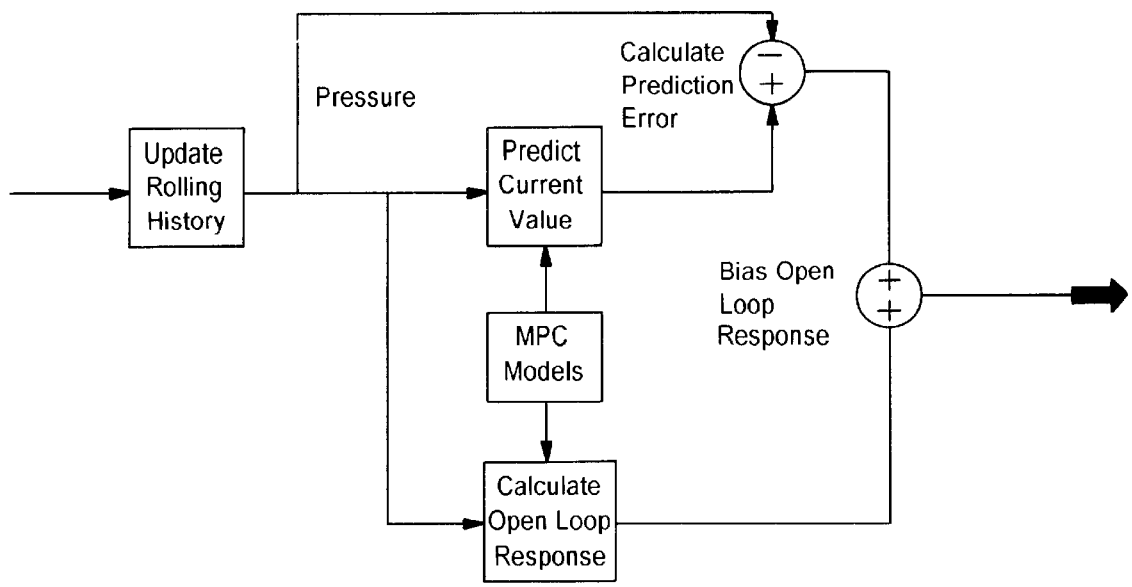
FIG. 4 is a schematic illustration of part of the execution of the gas distribution system control of the pipeline controller.
Figure 5:
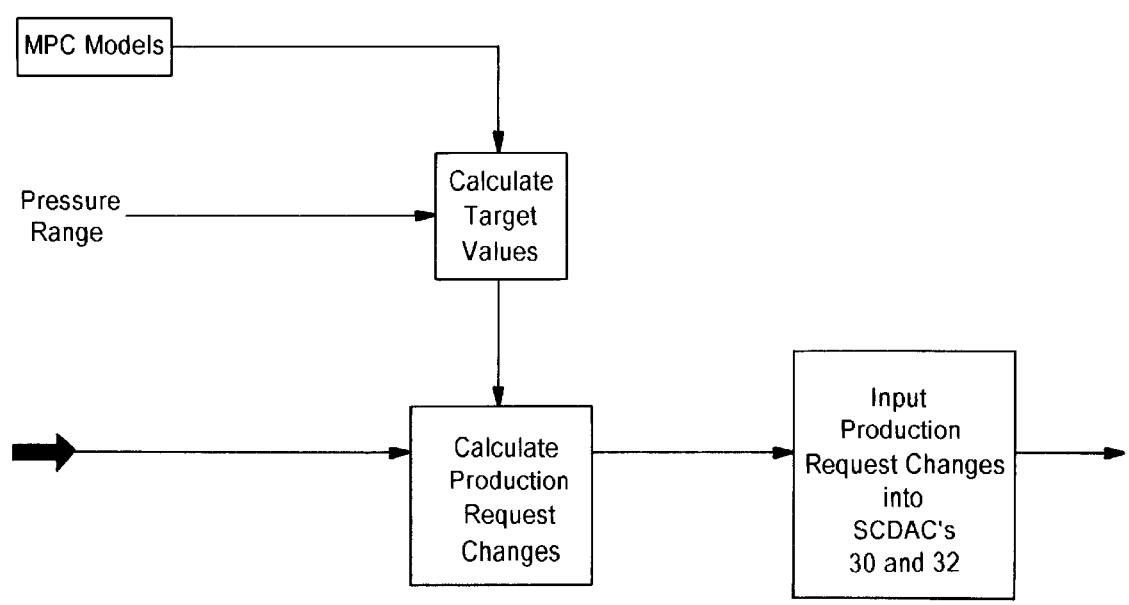
FIG. 5 are a schematic illustration of the remaining part of the execution of the gas distribution system control to be applied to the pipeline controller.

With additional reference to FIGS. 4 and 5, a detailed map of the execution of a model predictive control program within pipeline controller 34 is illustrated. In this regard, the model predictive control program preferably executes every five minutes, consistent with the sample time of the rolling history. It is to be noted that practical execution times can range from between about one minute to about five minutes. As indicated in FIG. 3, the rolling history is updated with production requests for gaseous oxygen and gaseous nitrogen with respect to air separation plants 18 and 20, the current values of pipeline section pressure as measured by pressure sensors 36 and 38, and the customer flow rates of gaseous oxygen and nitrogen as measured by flow meters 44, 46 for customer 14 and flow meters 48, 50 for customer 16.

It is to be noted that the update of current production requests is necessary to serve as a base upon which production request changes computed by pipeline controller 34 are added or subtracted. However, slightly modified schemes are possible in which pipeline controller 34 only computes changes in production requests to be applied to supervisory control and data acquisition computers 30 and 32 which are programmed to accept the changes and apply them to the current production requests. Therefore, the term "production request changes" as used herein and in the claims means either the unit based production request to be added or subtracted to the current production request or the totals of unit based production requests added or subtracted to the current production request.

As a first step, using the pressures within the pipeline sections 10 and 12 registered just prior to the start of the current prediction, the open loop responses of each of the pipeline sections 10 and 12 is determined from the models illustrated in FIG. 2 which are referred to in FIG. 4 as "MPC Models". The pressures determined from such calculation is then compared to the actual measured pressure at the start of the current prediction horizon and the difference in pressure is applied as a correction factor to the open loop response calculations for pipeline sections 10 and 12 over the current prediction horizon.

With specific reference to FIG. 5, also pre-programmed within pipeline controller 34 are allowed pressure ranges for each pipeline section 10 and 12. Pipeline controller 34 will attempt to set changes in the production of air separation plants 18 and 20 to maintain the pipeline pressure at a target value within the range. In this regard, the empirically based step response models of pressure for a unit increase in plant production are used to determine a target value. This target value can be the minimum pressure within the pressure range for a particular pipeline section, but not always. For instance, if the air separation plants are to be turned down to decrease production in response to an increase in pipeline pressure produced by a customer decreasing the flow rate of a particular product, the air separation plants may not have the capability of sufficiently decreasing production over the prediction horizon so as to arrive at the minimum pressure within the range.

Once desired target values are determined, the next step is to determine the number of future control actions within the control horizon to be calculated at each controller execution. The shorter the control horizon the more aggressive the controller. Using the previously defined prediction horizon, the pipeline controller performs the following sequence at each controller execution. As indicated previously, the controller predicts the future response of the controlled variable, namely the pressure, over the prediction horizon assuming no future control actions are implemented. This is defined is the open loop response. The closed loop prediction is then the sum of the open loop response and the response driven by future control actions. The control problem becomes that of finding the set of manipulated variable changes that minimize the difference between the closed loop prediction and the target value. That is minimizing the difference between each change in the manipulated variable that is the production rate requests and the deviation of the production rate requests from the target. This is done through optimization which can be a least square solution or other optimization solution. A set of production rate request changes is thereby generated and a first of such production rate request changes is inputted into the supervisor control and data acquisition programs 30 and 32. Since the model predictive control program is continually executing, if a change in pressure is measured that tends towards the target pressure, the next first production rate request of the next set of production rate request changes will be less than that which would otherwise be required. In such manner, the target pressure is rapidly approached. Additionally, if there exists a change in pressure due to future customer actions, then such actions can be accounted for in future program executions.

Instantaneous transients are handled by adding additional amounts of gaseous product back into the pipelines should the pressure fall below the range. This is done in a known manner by storing liquid products in facilities 52 and 54. Additionally, for safety reasons, if the pressure exceeds the range, gaseous product can be vented from the pipeline sections through pressure relief valves associated with air separation plants 18 and 20.

The model predictive control system can be constrained in various ways. Since there exists four times as much nitrogen in the air than oxygen, oxygen becomes the more valuable product. Therefore, the model predictive controller can be made to be responsive solely to changes in pressure for pipeline section 10 in which oxygen are to be supplied. Excess nitrogen is vented.

Preferably though the model predictive controller can be made responsive to the pressure in each of the pipeline sections 10 and 12 to determine a set of future changes to production requests that are related to the pressures measured in pipeline sections 10 and 12. Air separation plants 18 and 20 are then controlled by pipeline controller such that future manipulated variables relating to the gaseous oxygen product will supercede those related to the nitrogen gaseous product to the extent required to maintain the pressure within the gaseous oxygen requirements.

Various constraints can be placed upon each of the air separation plants 18 and 20. For instance, such constraints can comprise costs. For instance, air separation plant 18 can have a less expensive energy contract than air separation plant 20. Moreover, there can be contractual power limits which cannot be violated without surcharges. Plant capacity of each of the air separation plants 18 and 20 is also a potential constraint. In other words, air separation plant 18 can be designed to only produce a portion of the potential oxygen requirements for a pipeline section while air separation plant 20 is designed to produce the remaining amounts. In such case, the model predictive controller is programmed to determine the amounts of gaseous oxygen and nitrogen products that each of the air separation plants are able to supply in accordance with the constraint. The model predictive controller then determines the plurality of sets of future manipulated variables for air separation plants that is optimized by constrained linear optimization in accordance with the amount of gaseous nitrogen and oxygen products.

With reference again to the matrix illustrated in FIG. 2, a power constraint is illustrated. This is programmed into the model predictive control program mentioned above as a controlled variable. Other constraints related to cost, capacity, and etc. would similarly be programmed.

While the present invention has been described in reference to a preferred embodiment, as will occur to those skilled in the art, numerous changes, additions and omissions may be made without departing from the spirit and scope of the present invention.

We claim:

1. A method of controlling a gas distribution system having at least one pipeline section and at least one air separation plant controlled by a supervisory control system responsive to production requests to direct a production rate of at least one gaseous product to be consumed by at least one customer connected to the at least one pipeline section, said method comprising:

continually measuring pressure within the least one pipeline section;

the pressure being dependent upon an actual flow rate of the at least one gaseous product within the at least one pipeline section; and controlling the pressure to be within a range that will ensure that the at least one customer will be able to obtain a required flow rate of the at least one gaseous product from the at least one pipeline section by continually:

storing pressure values of the pressure and production request values of production requests associated with each of the pressure values in a rolling history;

inputting said pressure values and production request values as controlled variables and manipulated variables, respectively, into a model predictive controller;

calculating, within the model predictive controller, over a prediction horizon, an open loop response of the pressure within the at least one pipeline section and a set of production request changes of the at least one air separation plant required to at least in part restore the pressure to a target value within said pressure range from said open loop response;

the calculation of the target value, the open loop response, and the set of production request changes being based on at least one empirically determined step response model of pressure within the at least one pipeline section in response to a unit production change in the request value of the at least one air separation plant and the set of future of production request changes being optimized to simultaneously minimize deviations of each of the future changes and the pressure from the target value over the prediction horizon; and inputting a first of said set of production request changes into said supervisory control system.

2. The method of claim 1, further comprising:

performing a further open loop response calculation to determine a calculated pressure value at the commencement of the prediction horizon from a prior pressure value occurring just prior to the prediction horizon; and applying a difference between an actual pressure value measured at the commencement of the prediction horizon and the calculated pressure value to the open loop response as a correction factor.

3. The method of claim 1 or claim 2, wherein the calculation of the future changes to the production rate of the at least one air separation plant is optimized on the basis of a least square error calculation.

4. The method of claim 1 or claim 2, wherein:

customer flow rate values of the at least one gaseous product to be consumed by the at least one customer are also measured and stored in said rolling history;

said customer flow rate values are inputted into said model predictive controller as feed forward variables; and the open loop response of the pressure within the at least one pipeline section is also based upon at least one empirically determined step response model of pressure within the at least one pipeline section in response to a unit change in customer flow rate of the at least one gaseous product to the at least one customer.

5. The method of claim 4, wherein:

the at least one pipeline section comprises at least first and second pipeline sections;

there are two of said gaseous products consisting of an oxygen gaseous product and a nitrogen gaseous product supplied to a first and second pipeline sections, respectively; and the model predictive controller is responsive to the pressure in at least the first pipeline section to determine the production request changes.

6. The method of claim 5, wherein:

the model predictive controller is responsive to the pressure in each of the first and second pipeline sections and determines sets of production request changes that are related to the first and second pipeline sections; and the at least one air separation plant is controlled such that the production request changes related to the oxygen gaseous product supercedes those related to the nitrogen gaseous product to the extent required to maintain the pressure within range of the first pipeline section.

7. The method of claim 5, wherein:

there are a plurality of said air separation plants that are each capable of supplying said gaseous oxygen and gaseous nitrogen product in accordance with a constraint;

the model predictive controller determines amounts of the gaseous oxygen and the gaseous nitrogen products that each of said air separation plants are able to supply in accordance with the constraint; and the model predictive controller determines sets of the production request changes for the air separation plants that are optimized by constrained linear optimization in accordance with the amounts of the gaseous oxygen and gaseous nitrogen products.

8. The method of claim 7, wherein the constraint comprises cost, contractual power limits, plant capacity or combinations thereof.

* * * * *